(12) United States Patent
Tsai (10) Patent No.: US 10,710,515 B2
(45) Date of Patent: Jul. 14, 2020

(54) IN-VEHICLE CAMERA DEVICE AND METHOD FOR SELECTING DRIVING IMAGE

(71) Applicant: Getac Technology Corporation, Hsinchu County (TW)

(72) Inventor: Kun-Yu Tsai, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 90 days.

(21) Appl. No.: 16/164,001

(22) Filed: Oct. 18, 2018

(65) Prior Publication Data

US 2020/0122645 A1    Apr. 23, 2020

(51) Int. Cl.
*B60R 11/04* (2006.01)
*G08G 1/017* (2006.01)
*H04N 5/42* (2006.01)
*H04N 5/235* (2006.01)

(52) U.S. Cl.
CPC .............. *B60R 11/04* (2013.01); *G08G 1/017* (2013.01); *H04N 5/235* (2013.01); *H04N 5/42* (2013.01); *B60R 2300/101* (2013.01)

(58) Field of Classification Search
CPC ...... B60R 11/04; B60R 2300/101; H04N 5/42; H04N 5/235; G08G 1/017
USPC ......................................................... 348/148
See application file for complete search history.

(56) References Cited

U.S. PATENT DOCUMENTS

2014/0177925 A1\* 6/2014 Wu .......................... G06K 9/00
                                                              382/105
2016/0229331 A1\* 8/2016 Adachi .................. B60Q 1/143

\* cited by examiner

*Primary Examiner* — Allen C Wong
(74) *Attorney, Agent, or Firm* — Locke Lord LLP; Tim Tingkang Xia, Esq.

(57) ABSTRACT

A method for filtering driving images includes enabling a light compensating unit at a first time point to emit supplemental light, capturing a first driving image under the supplemental light at the first time point by an image capturing unit, disabling the light compensating unit at a second time point, capturing a second driving image at the second time point by the image capturing unit, selecting the first driving image according to a first brightness difference between the first driving image and the second driving image and a predetermined threshold, and outputting the first driving image when the first brightness difference is greater than or equal to the predetermined threshold.

12 Claims, 8 Drawing Sheets

IN-VEHICLE CAMERA DEVICE AND METHOD FOR SELECTING DRIVING IMAGE

BACKGROUND OF THE INVENTION

Field of the Invention

The present invention relates to driving image selection, and more particularly to an in-vehicle camera device and a method for selecting a driving image.

Description of the Prior Art

Accompanied by transformation in social patterns, various types of transportation vehicles are extensively applied in the daily life. To effective manage these transportation vehicles, each transportation vehicle is fundamentally assigned with a license plate consisting of numbers and/or alphabetical letters for identification and management of a manager. With the technology breakthrough and development in the recently years, image recognition is generally adopted to identify a license plate fixed on a transportation vehicle to facilitate management of transportation vehicles in colossal amounts for a manager.

SUMMARY OF THE INVENTION

In one embodiment, a method for selecting a driving image includes enabling a light compensating unit at a first time point to emit supplemental light, capturing a first driving image under the supplemental light at the first time point by an image capturing unit, disabling the light compensating unit at a second time point, capturing a second driving image at the second time point by the image capturing unit, selecting the first driving image according to a first brightness difference between the first driving image and the second driving image and a predetermined threshold, and outputting the first driving image when the first brightness difference is greater than or equal to the predetermined threshold.

In one embodiment, an in-vehicle camera device includes a light compensating unit, an image capturing unit and a processing unit. The light compensating unit emits supplemental light. The image capturing unit performs image capturing. The processing unit enables the light compensating unit at a first time point and captures a first driving image under the supplemental light of the light compensating unit by using the image capturing unit. The processing unit disables the light compensating unit at a second time point and captures a second driving image by using the image capturing unit. The processing unit further selects the first driving image according to a first brightness difference between the first driving image and the second driving image and a predetermined threshold, and outputs the first driving image when the first brightness difference is greater than or equal to the predetermined threshold.

In conclusion, the in-vehicle camera device and the method for selecting a driving image of the embodiments of the present invention quickly select, according to a brightness difference between two driving images sequentially and respectively captured with and without the assistance of supplemental light and by dynamically filtering out background noise, a driving image including a license plate, thus significantly reducing the number of images needed for performing image processing as well as remarkably enhancing the speed and yield rate for subsequent image recognition.

Detailed features and advantages of the present invention are given in the embodiments below. The disclosure is sufficient for a person skilled in the art to understand and accordingly implement the technical contents of the present invention. On the basis of the disclosure, claims and drawings of the application, a person skilled in the art can easily understand related objects and advantages of the present invention.

DETAILED DESCRIPTION OF THE EMBODIMENTS

Figure 1:
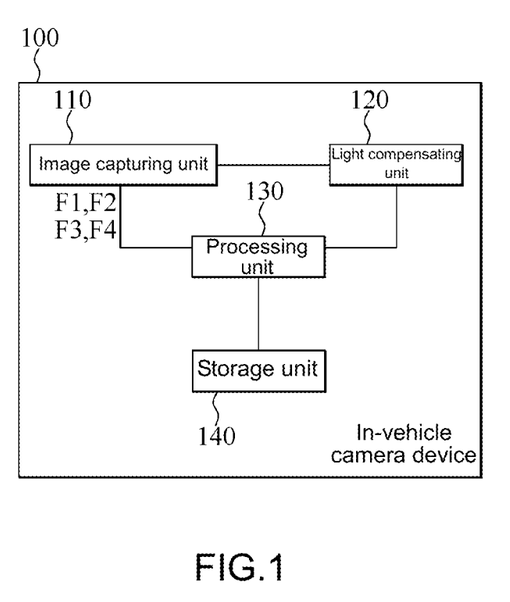
FIG. 1 is a block diagram of an in-vehicle camera device according to an embodiment.

FIG. 1 shows a block diagram of an in-vehicle camera device according to an embodiment. Referring to FIG. 1, in general, an in-vehicle camera device 100 may be, for example, mounted in a transportation vehicle, and may be used to capture images within an image capturing range to sequentially acquire multiple driving images. In some embodiments, the transportation vehicle may be an automobile or a motorcycle. However, the present invention is not limited to the above examples; any transportation vehicle suitably applying the in-vehicle camera device 100 is to be encompassed within the scope of the present invention.

In one embodiment, the in-vehicle camera device 100 includes an image capturing unit 110, a light compensating unit 120 and a processing unit 130. The light compensating unit 120 is coupled to the image capturing unit 110, and the processing unit 130 is coupled to the image capturing unit 110 and the light compensating unit 120.

The image capturing unit 110 captures a plurality of driving images, which may be a plurality of frames captured by the image capturing unit 110 within a continuous period. The light compensating unit 120 outputs supplemental light to assist image capturing performed by the image capturing unit 110.

In some embodiments, the image capturing unit 110 may include a set of lens and light sensing element. The light sensing element is, for example, a complementary metal oxide semiconductor (CMOS) or a charge-coupled device (CCD). Further, the light-supplementing unit 120 may be implemented by, for example, a light emitting diode (LED), an infrared light emitting diode (IR LED), a halogen light or a laser light source. It should be noted that the present invention is not limited to the above examples.

The processing unit 130 is capable of quickly selecting a driving image including a license plate image from a plurality of driving images according to the method for selecting a driving image according to any one of the embodiments of the present invention, and accordingly enhancing the speed and yield rate of subsequent image recognition. In some embodiments, the processing unit 130 can be implemented by at least one selected from a group consisting of a system-on-chip (SoC), a digital signal processor (DSP), a field programmable gate array (FPGA), a central processing unit (CPU), a microcontroller unit (MCU), an application-specific integrated circuit (ASIC); however, the present invention is not limited to the above examples.

Figure 2:
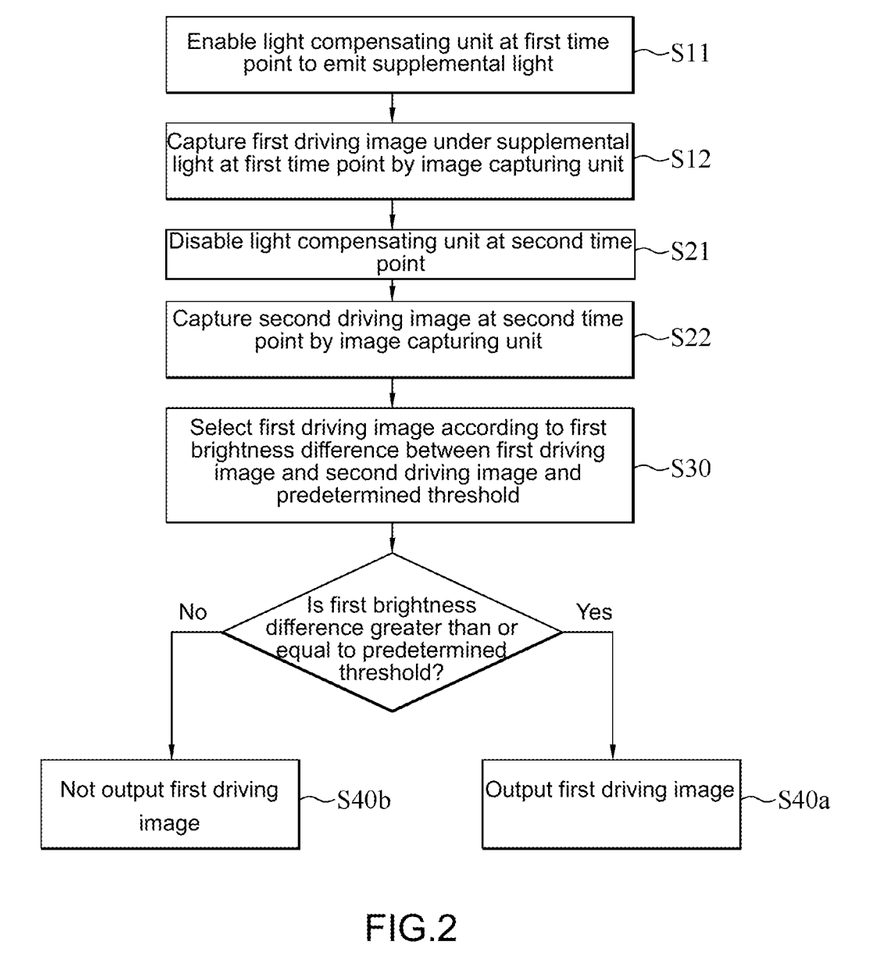
FIG. 2 is a flowchart of a method for selecting a driving image according to an embodiment.

FIG. 2 shows a flowchart of a method for selecting a driving image according to an embodiment. Referring to FIG. 1 and FIG. 2, in the method for selecting a driving image according to an embodiment, at a first time point, the processing unit 130 enables the light compensating unit 120 to emit supplemental light (step S11), and the processing unit 130 further enables the image capturing unit 110 to perform image capturing such that the image capturing unit 110 captures a first driving image F1 with the assistance of the supplemental light (step S12). At a second time point, the processing unit 130 disables the light compensating unit 120 such that the light compensating unit 120 does not emit any supplemental light (step S21), and the processing unit 130 further enables the image capturing unit 110 to perform image capturing such that the image capturing unit 110 captures a second driving image F2 without the assistance of the supplemental light (step S22).

In some embodiments, the second time point is later than the first time point. However, the present invention is not limited thereto; in some other embodiments, the second time point may be earlier than the first time point.

In some embodiments, the license plate of a vehicle may be coated with highly reflective coating. If the first driving image F1 and the second driving image F2 captured by the image capturing unit 110 include the license plate image, the brightness level of the license plate image in the first driving image F1 captured with the assistance of supplemental light should be higher than the brightness level of the license plate image in the second driving image F2 captured without the assistance of supplemental light. At this point, the difference in the brightness levels between the first driving image F1 and the second driving image F2 is relatively large. If the first driving image F1 and the second driving image F2 captured by the image capturing unit 110 do not include the license plate image, the difference in the brightness levels between the first driving image F1 and the second driving image F2 is not significant.

Thus, the processing unit 130, after acquiring a first brightness difference between the first driving image F1 and the second driving image F2, compares the first brightness difference with a predetermined threshold, and determines according to the comparison result whether the first driving image F1 includes the license plate image (step S30). In other words, the processing unit 130 can use the second driving image F2 as a filtering reference, quickly filter out background noise from the first driving image F1 according to the second driving image F2, and accordingly select the first driving image F1 to quickly select the first driving image F1 including the license plate image.

When the processing unit 130 determines that the first brightness difference is greater than or equal to the predetermined threshold, it means that the first driving image F1 includes the license plate image, and so the processing unit 130 outputs the first driving image F1 to a back-end circuit to perform subsequent processing (step S40a). When the processing unit 130 determines that the brightness difference is smaller than the predetermined threshold, it means that the first driving image F1 does not include the license plate image, and so the processing unit 130 does not output the first driving image F1 to a back-end circuit (step S40b). Thus, with the pre-selection performed by the processing unit 130, the number of images outputted to a back-end circuit can be significantly reduced, while the speed and yield rate of subsequent image recognition are remarkably enhanced. In some embodiments, the back-end circuit is, for example but not limited to, an image processing circuit, an image recognition circuit, a storage circuit and a cloud server. Further, the back-end circuit can be provided in the in-vehicle camera device. However, the present invention is not limited thereto; the back-end circuit may also communicate with the processing unit 130 through wired or wireless means and can thus be provided outside the in-vehicle camera device 100.

In some embodiments, the first driving vehicle F1 may include a plurality of first pixels, each of which may display a corresponding grayscale according to one grayscale level among a plurality of grayscale levels. Similarly, the second driving image F2 may also include a plurality of second pixels, each of which displays a corresponding grayscale according to one grayscale level among a plurality of grayscale levels. In other words, the displayed form of the first driving image F1 (or the second driving image F2) may be determined according to the grayscales displayed by the first pixels (or the second pixels) included in the first driving image F1 (or the second driving image F2) and positions thereof.

In some embodiment, the first driving image F1 (or the second driving image F2) may consist of 1280*720 first pixels (or second pixels); however, the present invention is not limited thereto. For example, the first driving image F1 (or the second driving image F2) may also consist of 360*240, 1920*1080, or any other number of pixels conforming to a display format standard. Further, the number of levels of the plurality of grayscales may be 256. However, the present invention is not limited to the above example, and the number of levels of grayscales may be determined according to the performance capability of the image capturing unit 110. For example, the image capturing unit 110 may include an analog-to-digital conversion circuit, and provide a performance capability of 1024 (i.e., $2^{10}$) grayscales when the analog-to-digital conversion circuit is 10-bit; and so forth.

Figure 3:
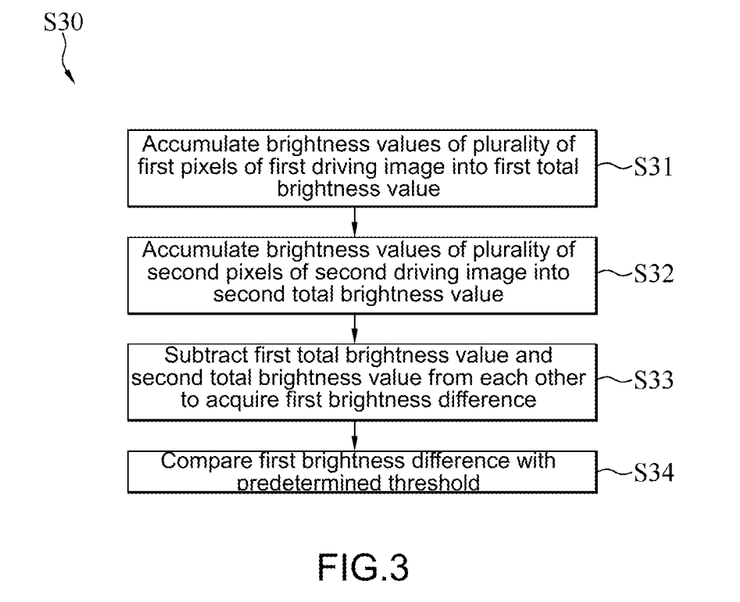
FIG. 3 is a flowchart of step S30 in FIG. 2.

FIG. 3 shows a flowchart of step S30 in FIG. 2 according to an embodiment. Referring to FIG. 1 to FIG. 3, in step S30 in one embodiment, the processing unit 130 accumulates brightness values of the first pixels of the first driving image F1 into a first total brightness value (step S31), and accumulates brightness values of the second pixels in the second driving image F2 into a second total brightness value (step S32). The processing unit 130 then subtracts the first total brightness value and the second total brightness value from each other to acquire a first brightness difference between the first driving image F1 and the second driving image F2 (step S33). The processing unit 130 further compares the acquired first brightness difference with a predetermined threshold to select the first driving image F1 (step S34).

Figure 4:
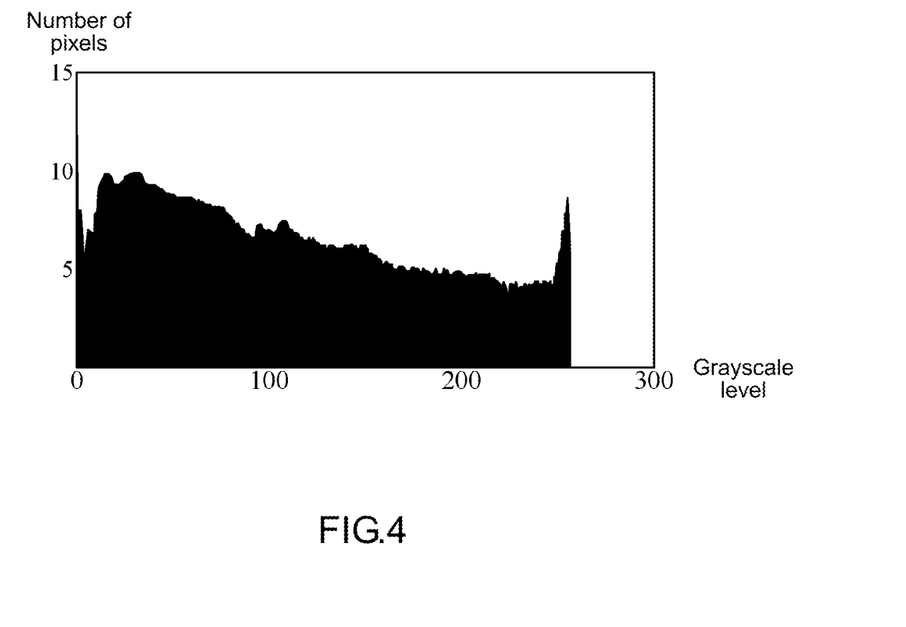
FIG. 4 is a histogram of a first driving image according to an embodiment.
Figure 5:
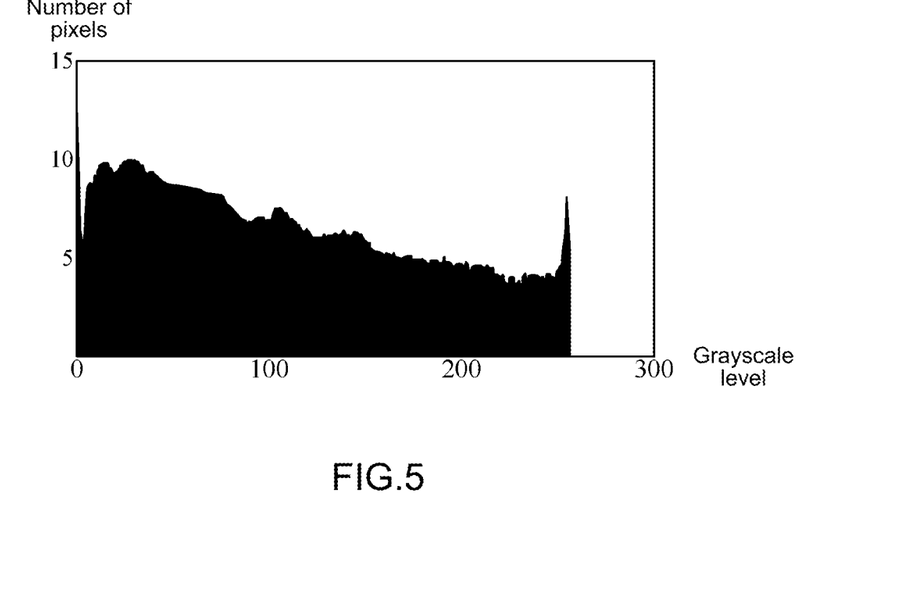
FIG. 5 is a histogram of a second driving image according to an embodiment.

In some embodiments, the processing unit 130 can generate a histogram of the first driving image F1 through image integration and conversion to obtain the distribution of grayscale numbers of the plurality of first pixels in regard to a plurality of grayscale levels, as shown in FIG. 4. Next, the processing unit 130 multiplies each of the grayscale levels by the number of pixels falling on this corresponding grayscale level and sums up to acquire the first total brightness value. Similarly, the processing unit 130 can generate a histogram of the second driving image F2 through image integration and conversion to obtain the distribution of grayscale numbers of the plurality of second pixels in regard to a plurality of grayscale levels, as shown in FIG. 5. Next, the processing unit 130 multiplies each of the grayscale levels by the number of pixels falling on this corresponding grayscale level and sums up to acquire the second total brightness value. The processing unit 130 then subtracts the first total brightness value and the second total brightness value from each other to acquire the first brightness difference, and compares the first brightness difference with the predetermined threshold. Further, the predetermined threshold may be a product of a minimum number of pixels and the highest grayscale level required for recognizing whether a driving image includes a license plate image. In some embodiments, a recognizable area of the license plate image is 40*80 pixels, and thus the minimum number of pixels required may be 3200 pixels. Further, when the highest grayscale level is 255, the predetermined threshold may be 81600 (i.e., 3200*255). However, the present invention is not limited to the above examples; the minimum number of pixels required may be determined according to the recognition technology used and the highest grayscale level may be determined according to the performance capability provided by the image capturing unit 110.

Figure 6:
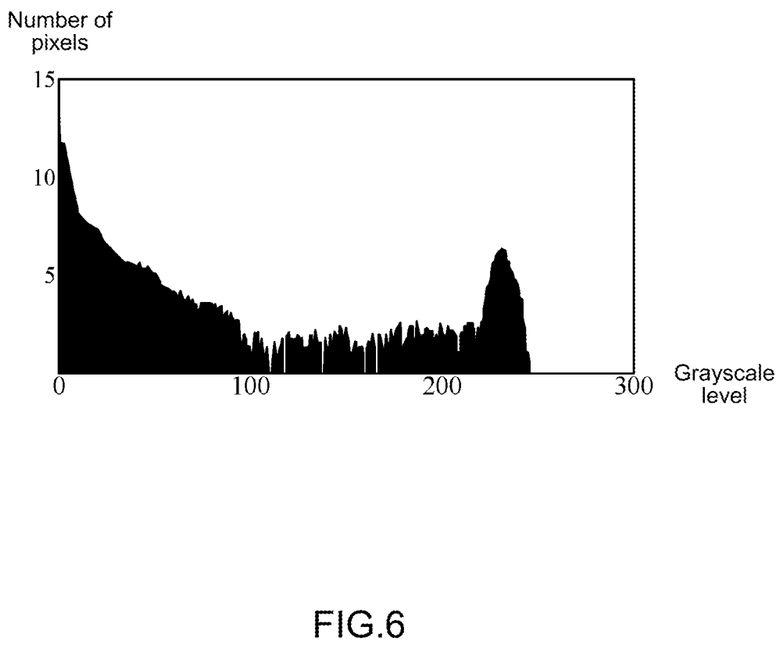
FIG. 6 is a histogram of subtracting FIG. 5 from FIG. 4 according to an embodiment.

In some other embodiments, the processing unit 130 may also directly subtract the histograms of the first driving image F1 and the second driving image F2 from each other by means of image subtraction to acquire a subtracted histogram, as shown in FIG. 6, and comparison is then performed on the basis of the subtracted histogram and the predetermined threshold. At this point, the first brightness difference may be presented in form of a histogram (i.e., the subtracted histogram), and the predetermined threshold may be the minimum number of pixels required for recognizing whether a driving image includes a license plate image. In addition, the processing unit 130 may determine whether the first driving image F1 includes a license plate image according to whether the number of all pixels having grayscale levels greater than or equal to a reference grayscale level in the subtracted histogram exceeds the predetermined threshold. In some embodiments, the reference grayscale level may be between the grayscale level 150 and the grayscale level 200.

Figure 7:
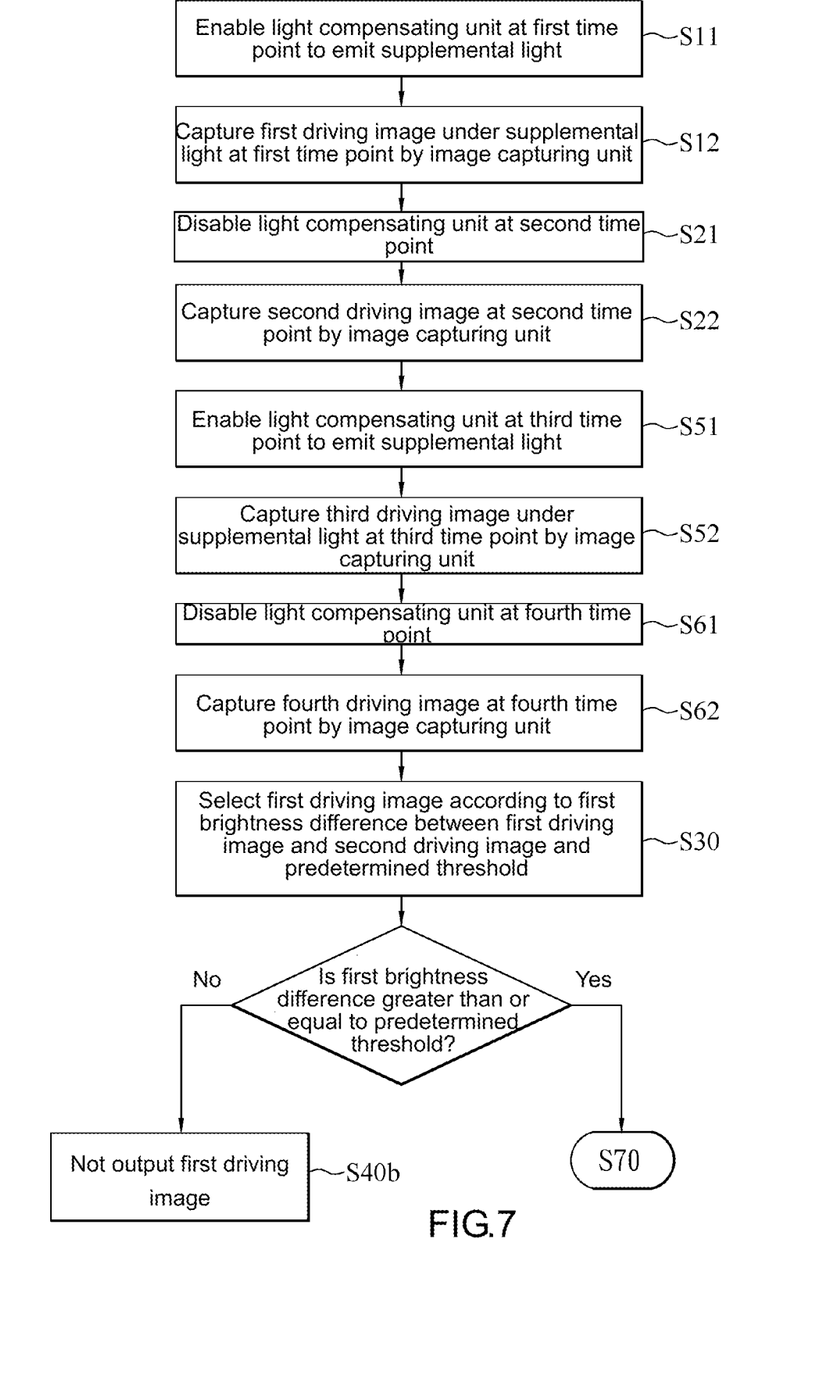
FIG. 7 is a flowchart of a method for selecting a driving image according to another embodiment.

FIG. 7 shows a flowchart of a method for selecting a driving image according to another embodiment of the present invention. Referring to FIG. 1 to FIG. 7, in a method for selecting a driving image of another embodiment, the processing unit 130 may enable the light compensating unit 120 at a third time point to emit supplemental light (step S51), and enable the image capturing unit 110 to perform image capturing such that the image capturing unit 110 captures a third driving image F3 with the assistance of the supplemental light at the third time point (step S53). Further, at a fourth time point, the processing unit 130 disables the light compensating unit 120 such that the light compensating unit 120 does not emit any supplemental light (step S61), and the processing unit 130 enables the image capturing unit 110 to perform image capturing such that the image capturing unit 110 captures a fourth driving image F4 without the assistance of the supplemental light (step S62).

In some embodiments, the third time point and the fourth time point are later than the first time point and the second time point. When the second time point is later than the first time point, the third time point is earlier than the fourth time point, and is between the second time point and the fourth time point. When the second time point is earlier than the first time point, the fourth time point is earlier than the third time point, and is between the first time pint and the third time point. In other words, the processing unit 130 intermittently enables the light compensating unit 120 to emit supplemental light, such that that the image capturing unit 110 captures driving images sequentially with and without the assistance of supplemental light.

In some embodiments, step S30 may be performed before step S61 and step S62. However, the present invention is not limited to the above example; step S30 may also be performed simultaneously with step S61 and step S62.

Figure 8:
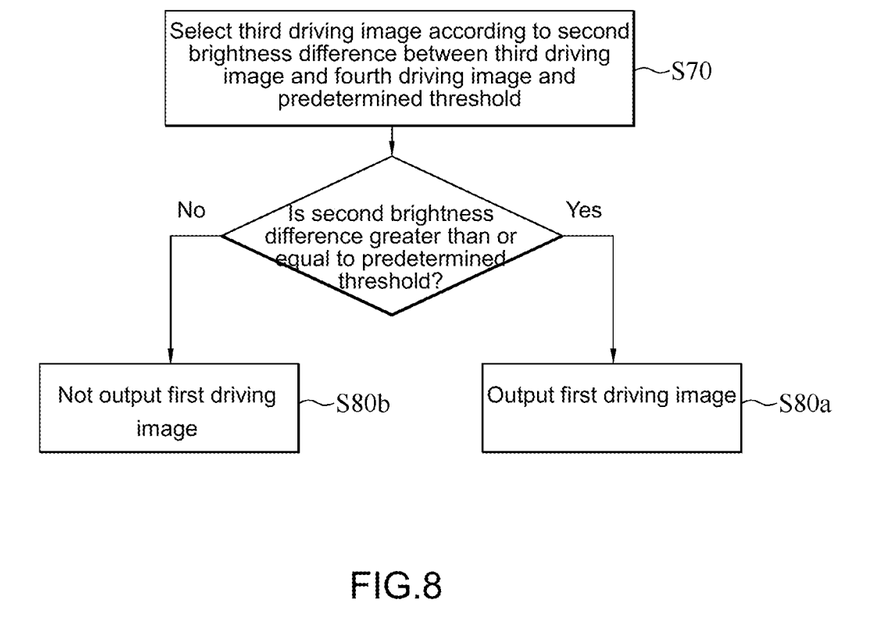
FIG. 8 is a flowchart of step S70 in FIG. 7 and subsequent steps.

FIG. 8 shows a flowchart of step S70 in FIG. 7 and subsequent steps. Referring to FIG. 1 to FIG. 8, in some embodiments, after the processing unit 130 determines that the first brightness difference is greater than or equal to the predetermined threshold in step S30, the processing unit 130 may, instead of outputting the first driving image F1, first compare a second brightness difference between the third driving image F3 and the fourth driving image F4 with the predetermined threshold, so as to perform re-confirmation on the first driving image F1 by determining whether the third driving image F3 includes a license plate image (step S70). Thus, when the processing unit 130 determines that the second brightness difference is greater than or equal to the predetermined threshold, it means that the third driving image F3 includes the license plate image, and the processing unit 130 then at this point outputs the first driving image F1 to the back-end circuit to perform sub-sequent processing (step S80a). When the processing unit 130 determines that the second brightness difference is smaller than the predetermined threshold, it means that the third driving image F3 does not include a license plate image, and thus the processing unit 130 chooses not to output the first driving image F1 to the back-end circuit (step S80b). As such, with the re-confirmation of the processing unit 130, the speed and yield rate for subsequent image recognition can be remarkably enhanced.

In some embodiments, the third driving image F3 may include a plurality of third pixels, each of which may display a corresponding grayscale according to one grayscale level among a plurality of grayscale levels. Similarly, the fourth driving image F4 may also include a plurality of fourth pixels, each of which displays a corresponding grayscale according to one grayscale level among a plurality of grayscale levels.

Figure 9:
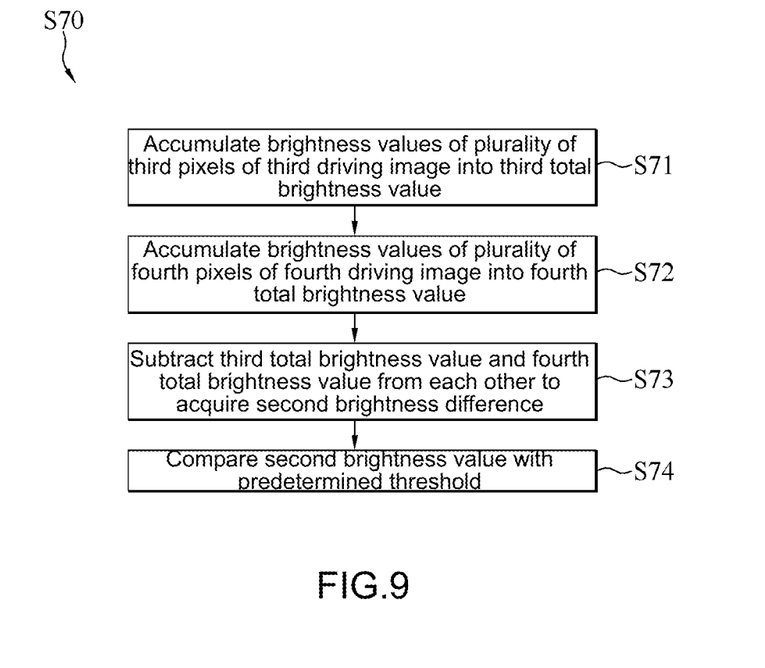
FIG. 9 is a flowchart of step S70 in FIG. 8 according to an embodiment.

FIG. 9 shows a flowchart of step S70 in FIG. 8 according to an embodiment. Referring to FIG. 1 to FIG. 9, in one embodiment of the step S70, the processing unit 130 may accumulates brightness values of all of the third pixels in the third driving image F3 into a third total brightness value (step S71), and accumulates brightness values of all of the fourth pixels in the fourth driving image F4 into a fourth total brightness value (step S72). The processing unit 130 then subtracts the third total brightness value and the fourth total brightness value from each other to acquire the second brightness difference between the third driving image F3 and the fourth driving image F4 (step S73). Further, the processing unit 130 compares the acquired second brightness difference with the predetermined threshold to select the third driving image F3 (step S74).

In some embodiments, the method of acquiring the third total brightness value and the fourth total brightness value is substantially the same as that for the first total brightness value and the second total brightness value, and associated details are omitted herein.

In step S80a in one embodiment, the third driving image F3 may be outputted to the back-end circuit along with the first driving image F1. However, the present invention is not limited thereto; the third driving image F3 may be outputted when it is determined that the next set of driving images include a license plate image. In other words, each driving image is at least confirmed twice as including a license plate image before the driving image is outputted to the back-end circuit.

In some embodiments, the image capturing unit 110 may capture the driving images according to a predetermined image capturing frequency and by means of global shutter. However, the present invention is not limited to the above example. In one embodiment, the image capturing unit 110 can capture driving images by means of rolling shutter. Further, the light compensating unit 120 may emit supplemental light according to a predetermined output frequency. At this point, the output frequency of the light compensating unit 120 is substantially one-half of the image capturing frequency of the image capturing unit 110, such that the image capturing unit 110 can capture driving images sequentially with and without the assistance of supplemental light. In one embodiment, the image capturing frequency of the image capturing unit 110 may be 60 frames per second (FPS). In another embodiment, the image capturing frequency of the image capturing unit 110 may also be 30 FPS.

In some embodiments, the method for selecting a driving image of any of the embodiments of the present invention can be realized by a readable recording medium device. The readable recording medium device stores a plurality of program codes, which enable the in-vehicle camera device 100 to perform the method for selecting a driving image of any of the foregoing embodiments when the in-vehicle camera device 100 loads and executes the plurality of program codes. In one embodiment, the readable recording medium device may be a storage unit 140 in the in-vehicle camera device 100 and coupled to the processing unit 130. The storage unit 140 can further store any data needed for the method for selecting a driving image, e.g., the driving images and the predetermined threshold. In some embodiments, the storage unit 140 may be implemented by one or more storage elements, and the storage elements are, for example but not limited to, a non-volatile memory, e.g., read-only memory (ROM) or flash memory, or a volatile memory, e.g., random-access memory (RAM). In another embodiment, the readable recording medium device be a remote storage unit which communicates with the in-vehicle camera device 100 through wired or wireless means. In yet another embodiment, the readable recording medium device may be a storage element outside the in-vehicle camera device 100, and be connected through a reader or a connector of the in-vehicle camera device 100 to access the program codes in the storage element.

In some embodiments, the in-vehicle camera device 100 may be implemented by an automated license plate reader (ALPR).

In conclusion, the in-vehicle camera device and the method for selecting a driving image of the embodiments of the present invention quickly select, according to a brightness difference between two driving images sequentially and respectively captured with and without the assistance of supplemental light and by dynamically filtering out background noise, a driving image including a license plate, thus significantly reducing the number of images needed for performing image processing as well as remarkably enhancing the speed and yield rate for subsequent image recognition.

While the invention has been described by way of example and in terms of the embodiments, it is to be understood that the invention is not limited thereto. Modifications and similar arrangements and procedures can be made by a person skilled in the art without departing from the spirit and scope of the present invention. Therefore, the scope of the appended claims should be accorded with the broadest interpretation so as to encompass all such modifications and similar arrangements and procedures.

What is claimed is:

1. A method for selecting a driving image, comprising:
enabling a light compensating unit at a first time point to emit supplemental light;
capturing a first driving image at the first time point under the supplemental light by an image capturing unit;
disabling the light compensating unit at a second time point;
capturing a second driving image at the second time point by the image capturing unit;
selecting the first driving image according to a first brightness difference between the first driving image and the second driving image and a predetermined threshold; and
outputting the first driving image when the first brightness difference is greater than or equal to the predetermined threshold,
wherein the first driving image outputted includes a license plate image, and the predetermined threshold is a product of a quantity of minimum pixels and a highest grayscale level needed for recognizing the license plate image.

2. The method according to claim 1, further comprising:
not outputting the first driving image when the first brightness difference is smaller than the predetermined threshold.

3. The method according to claim 1, wherein the step of selecting the first driving image comprises:
accumulating brightness values of a plurality of first pixels of the first driving image into a first total brightness value;
accumulating brightness values of a plurality of second pixels of the second driving image into a second total brightness value;
subtracting the first total brightness value and the second total brightness value from each other to acquire the first brightness difference; and
comparing the first brightness difference with the predetermined threshold.

4. The method according to claim 1, further comprising:
enabling the light compensating unit at a third time point to emit the supplemental light, wherein the third time point is later than the first time point and the second time point;
capturing a third driving image at the third time point under the supplemental light by the image capturing unit;
disabling the light compensating unit at a fourth time point, wherein the fourth time point is later than the first time point and the second time point; and
capturing a fourth driving image at the fourth time point by the image capturing unit;
wherein, the step of outputting the first driving image comprises:

selecting the third driving image according to a second brightness difference between the third driving image and the fourth driving image and the predetermined threshold;

outputting the first driving image when the second brightness difference is greater than or equal to the predetermined threshold; and not outputting the first driving image when the second brightness difference is smaller than the predetermined threshold.

5. An in-vehicle camera device, comprising:
a light compensating unit, emitting supplemental light;
an image capturing unit, performing image capturing; and
a processing unit, enabling the light compensating unit at a first time point and capturing a first driving image under the supplemental light by using the image capturing unit, disabling the light compensating unit at a second time point and capturing a second driving image by using the image capturing unit, selecting the first driving image according to a first brightness difference between the first driving image and the second driving image and a predetermined threshold, and outputting the first driving image when the first brightness difference is greater than or equal to the predetermined threshold,
wherein the first driving image outputted includes a license plate image, and the predetermined threshold is a product of a quantity of minimum pixels and a highest grayscale level needed for recognizing the license plate image.

6. The in-vehicle camera device according to claim 5, wherein the processing unit does not output the first driving image when the first brightness difference is smaller than the predetermined threshold.

7. The in-vehicle camera device according to claim 5, wherein the processing unit accumulates brightness values of a plurality of first pixels of the first driving image into a first total brightness value, accumulates brightness values of a plurality of second pixels of the second driving image into a second total brightness value, and subtracts the first total brightness value and the second total brightness value from each other to acquire the first brightness difference.

8. The in-vehicle camera device according to claim 5, wherein the processing unit further enables the light compensating unit at a third time point to emit the supplemental light and captures a third driving image under the supplemental light at the third time point by using the image capturing unit, disables the light compensating unit at a fourth time point and captures a fourth driving image at the fourth time point by using the image capturing unit, selects the third driving image according to the second brightness difference between the third driving image and the fourth driving image and the predetermined threshold when the first brightness difference is greater than or equal to the predetermined threshold, outputs the first driving image when the second brightness difference is greater than or equal to the predetermined threshold, and does not output the first driving image when the second brightness difference is smaller than the predetermined threshold; wherein, the third time point and the fourth time point are later than the first time point and the second time point, respectively.

9. A method for selecting a driving image, comprising:
enabling a light compensating unit at a first time point to emit supplemental light;
capturing a first driving image at the first time point under the supplemental light by an image capturing unit;
disabling the light compensating unit at a second time point;
capturing a second driving image at the second time point by the image capturing unit;
selecting the first driving image according to a first brightness difference between the first driving image and the second driving image and a predetermined threshold; and
outputting the first driving image when the first brightness difference is greater than or equal to the predetermined threshold,
wherein the step of selecting the first driving image comprises:
accumulating brightness values of a plurality of first pixels of the first driving image into a first total brightness value;
accumulating brightness values of a plurality of second pixels of the second driving image into a second total brightness value;
subtracting the first total brightness value and the second total brightness value from each other to acquire the first brightness difference; and
comparing the first brightness difference with the predetermined threshold.

10. The method according to claim 9, wherein the first driving image outputted includes a license plate image.

11. The method according to claim 9, further comprising:
not outputting the first driving image when the first brightness difference is smaller than the predetermined threshold.

12. The method according to claim 9, further comprising:
enabling the light compensating unit at a third time point to emit the supplemental light, wherein the third time point is later than the first time point and the second time point;
capturing a third driving image at the third time point under the supplemental light by the image capturing unit;
disabling the light compensating unit at a fourth time point, wherein the fourth time point is later than the first time point and the second time point; and
capturing a fourth driving image at the fourth time point by the image capturing unit;
wherein, the step of outputting the first driving image comprises:
selecting the third driving image according to a second brightness difference between the third driving image and the fourth driving image and the predetermined threshold;
outputting the first driving image when the second brightness difference is greater than or equal to the predetermined threshold; and
not outputting the first driving image when the second brightness difference is smaller than the predetermined threshold.

* * * * *